United States Patent
Jones et al.

(10) Patent No.: US 10,893,093 B2
(45) Date of Patent: Jan. 12, 2021

(54) TRANSLATING A USER'S WORKING CONTEXT FROM ONE OPERATING SYSTEM AND ASSOCIATED APPLICATIONS TO A DIFFERENT OPERATING SYSTEM AND ASSOCIATED APPLICATIONS

(71) Applicant: INTERNATIONAL BUSINESS MACHINES CORPORATION, Armonk, NY (US)

(72) Inventors: Andrew R. Jones, Round Rock, TX (US); Gregory J. Boss, Saginaw, MI (US); John E. Moore, Jr., Pflugerville, TX (US); Charles S. Lingafelt, Durham, NC (US); Kevin C. McConnell, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 15/874,289

(22) Filed: Jan. 18, 2018

(65) Prior Publication Data
US 2019/0222634 A1 Jul. 18, 2019

(51) Int. Cl.
*H04L 29/08* (2006.01)
*G06F 9/54* (2006.01)
*H04L 29/06* (2006.01)
*G06F 16/11* (2019.01)

(52) U.S. Cl.
CPC .............. *H04L 67/10* (2013.01); *G06F 9/541* (2013.01); *G06F 9/543* (2013.01); *H04L 67/2814* (2013.01); *H04L 69/08* (2013.01); *G06F 16/116* (2019.01)

(58) Field of Classification Search
CPC ........... H04L 67/10; G06F 9/541; G06F 9/543
USPC ......................................................... 709/217
See application file for complete search history.

(56) References Cited

U.S. PATENT DOCUMENTS

| 5,361,358 A | * | 11/1994 | Cox | .......................... G06F 8/61 |
| | | | | 713/1 |
| 5,673,403 A | * | 9/1997 | Brown | .................... G06F 9/452 |
| | | | | 715/744 |
| 7,289,975 B2 | | 10/2007 | Clarke et al. | |
| 7,487,248 B2 | | 2/2009 | Moran et al. | |

(Continued)

OTHER PUBLICATIONS

Ghiani et al., "Push and pull of web user interfaces in multi-device environments", Proceedings of the International Working Conference on Advanced Visual Interfaces. ACM, 2012, 8 pages.

(Continued)

*Primary Examiner* — Meng Vang
(74) *Attorney, Agent, or Firm* — Brian Restauro; Andrew D. Wright; Roberts Calderon Safran & Cole, P.C.

(57) ABSTRACT

Systems and methods for transferring data are disclosed. A method includes: receiving an indication to transfer data from a first application on a first computer device running on a first operating system to a second application on a second computer device running on a second operating system that is different than the first operating system; extracting the data from the first application on the first computer device based on the receiving; and transmitting the data to the second computer device based on the extracting.

20 Claims, 4 Drawing Sheets

(56) References Cited

U.S. PATENT DOCUMENTS

| | | | |
|---|---|---|---|
| 8,046,570 B2 | 10/2011 | King et al. | |
| 2002/0010746 A1* | 1/2002 | Jilk, Jr. | H04L 51/28 |
| | | | 709/206 |
| 2002/0120776 A1* | 8/2002 | Eggebraaten | G06Q 10/10 |
| | | | 709/246 |
| 2006/0026238 A1* | 2/2006 | Schwarz | H04L 51/14 |
| | | | 709/206 |
| 2007/0106705 A1* | 5/2007 | Chalana | G06F 16/258 |
| 2008/0133903 A1 | 6/2008 | Sun et al. | |
| 2008/0196043 A1 | 8/2008 | Feinleib et al. | |
| 2012/0005571 A1* | 1/2012 | Tang | G06F 17/289 |
| | | | 715/234 |
| 2012/0095878 A1* | 4/2012 | Feldman | G06Q 30/0641 |
| | | | 705/27.1 |
| 2013/0268687 A1* | 10/2013 | Schrecker | H04W 12/06 |
| | | | 709/229 |
| 2013/0297281 A1* | 11/2013 | Niemeyer | G06F 17/5009 |
| | | | 703/20 |
| 2014/0026187 A1* | 1/2014 | Johnson | G06F 21/53 |
| | | | 726/3 |
| 2014/0141714 A1 | 5/2014 | Ghosh et al. | |
| 2015/0032889 A1* | 1/2015 | Chan | H04L 67/1095 |
| | | | 709/224 |
| 2015/0242370 A1* | 8/2015 | Seo | G06F 17/2247 |
| | | | 715/239 |
| 2016/0192173 A1 | 6/2016 | Ghosh et al. | |

OTHER PUBLICATIONS

Use Continuity to connect your Mac, iPhone, iPad, iPod touch, and Apple Watch, https://support.apple.com/en-us/HT204681, accessed Dec. 13, 2016, 9 pages.

* cited by examiner

TRANSLATING A USER'S WORKING CONTEXT FROM ONE OPERATING SYSTEM AND ASSOCIATED APPLICATIONS TO A DIFFERENT OPERATING SYSTEM AND ASSOCIATED APPLICATIONS

BACKGROUND

The present invention relates generally to transferring data from one device to another device and, more particularly, to transferring data from a first device with a first operating system to a second device with a second operating system that is different than the first operating system.

As users utilize applications on multiple personal computing devices, manufacturers are offering options to the user for transferring information across multiple computing devices. During a working session, a user may utilize an email application on a personal computing device to begin drafting an email and may utilize another personal computing device to complete drafting the email in the same email application. Other systems have been proposed that enable the user to transfer to the draft email from one computing device, such as a tablet, to another computing device, such as a desktop computer running the same application.

SUMMARY

In an aspect of the invention, a computer-implemented method includes: receiving, by a translating computer device, an indication to transfer data from a first application on a first computer device running on a first operating system to a second application on a second computer device running on a second operating system that is different than the first operating system; extracting, by the translating computer device, the data from the first application on the first computer device based on the receiving; and transmitting, by the translating computer device, the data to the second computer device based on the extracting.

In another aspect of the invention, a computer program product comprising a computer readable storage medium having program instructions embodied therewith. The program instructions executable by a computer device to cause the computer device to receive an indication to transfer data from a first application on a first computer device running on a first operating system to a second application on a second computer device running on a second operating system that is different than the first operating system; in response to the receiving, extract data from the first application by converting the data from the first application into a format useable by the second application by mapping the data from fields of the first application to the fields on the second application; and transmit the data to the second computer device based on the converting.

In another aspect of the invention, there is a system for transferring data. The system includes: a CPU, a computer readable memory and a computer readable storage medium associated with a computing device with program instructions to receive an indication to transfer data from a first application on a first computer device running on a first operating system to a second application on a second computer device running on a second operating system that is different than the first operating system; program instructions to extract data from the first application on the first computer device based on the receiving; and program instructions to transmit the data to a second computer device based on the converting.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to transferring data from one device to another device and, more particularly, to transferring data from a first device with a first operating system to a second device with a second operating system that is different than the first operating system. The first operating system and the second operating system may be non-identical. Currently, significant difficulty exists in transferring data of computer applications during a working session across multiple computing devices with different operating systems. Aspects of the present invention provide a system for transferring data of computer applications during a working session from a computing device with first operating system (OS) and computer architecture to another computing device with a different OS and computer architecture. Advantageously, the present invention provides a system for transferring work on a computing platform with limited capabilities (e.g., a small display) and functions to another computing platform with more advanced capabilities and functions even though the other computing platform operates with a different operating system. Other advantages include providing for improved hand-off of information from non-identical applications where the non-identical applications operate on different devices with different operating systems.

As described herein, an OS is software on the hard drive of a computing device that enables the computing device hardware to communicate and operate with the computing device software. As described herein, a computer architecture is a set of rules and methods that describe the functionality, organization, and implementation of computer systems.

In aspects, the present invention extracts working session data from a first application (e.g., word processing, spreadsheet, email, etc.) running on a first computing device (e.g., smart phones, tablets, portable computers, desktop computer, etc.) with a first OS and computer architecture. Aspects of the present invention convert the working session data (e.g., the data state of the application and the metadata of the application) of the first application into a format compatible with a second application running on a second computing device having a second OS and computer architecture. Aspects of the present invention may include opening the second application on the second computing device and automatically populating fields in the second application with data extracted from the first application.

For example, implementations of the invention may be configured to extract data of a header and body of a word processing document of a word processing application from a desktop computer running on a desktop-based OS and computer architecture. In aspects, the present invention converts the extracted data to a mobile OS and computer architecture and opens another word processing application on a tablet computer running on a mobile OS and computer architecture.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
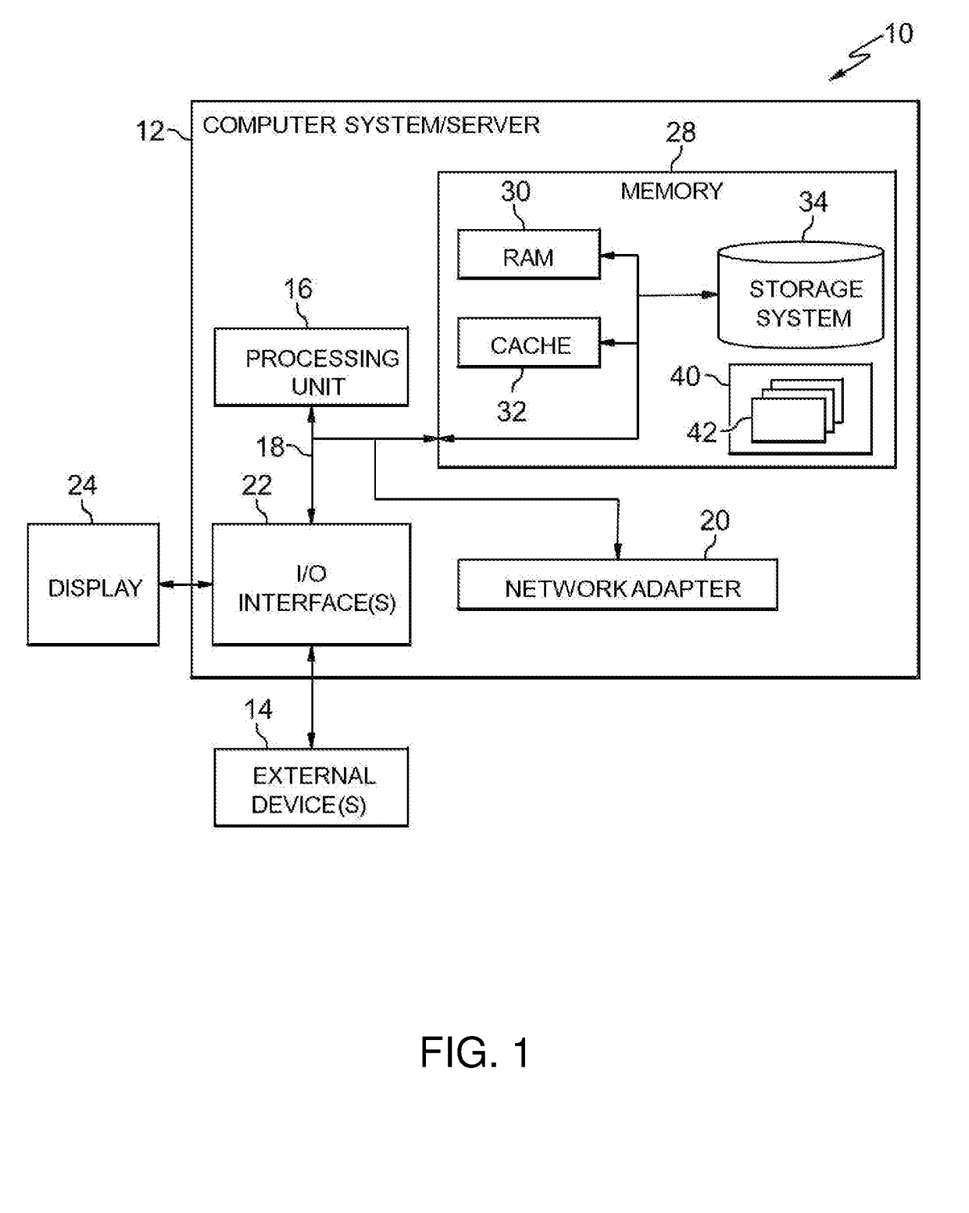
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
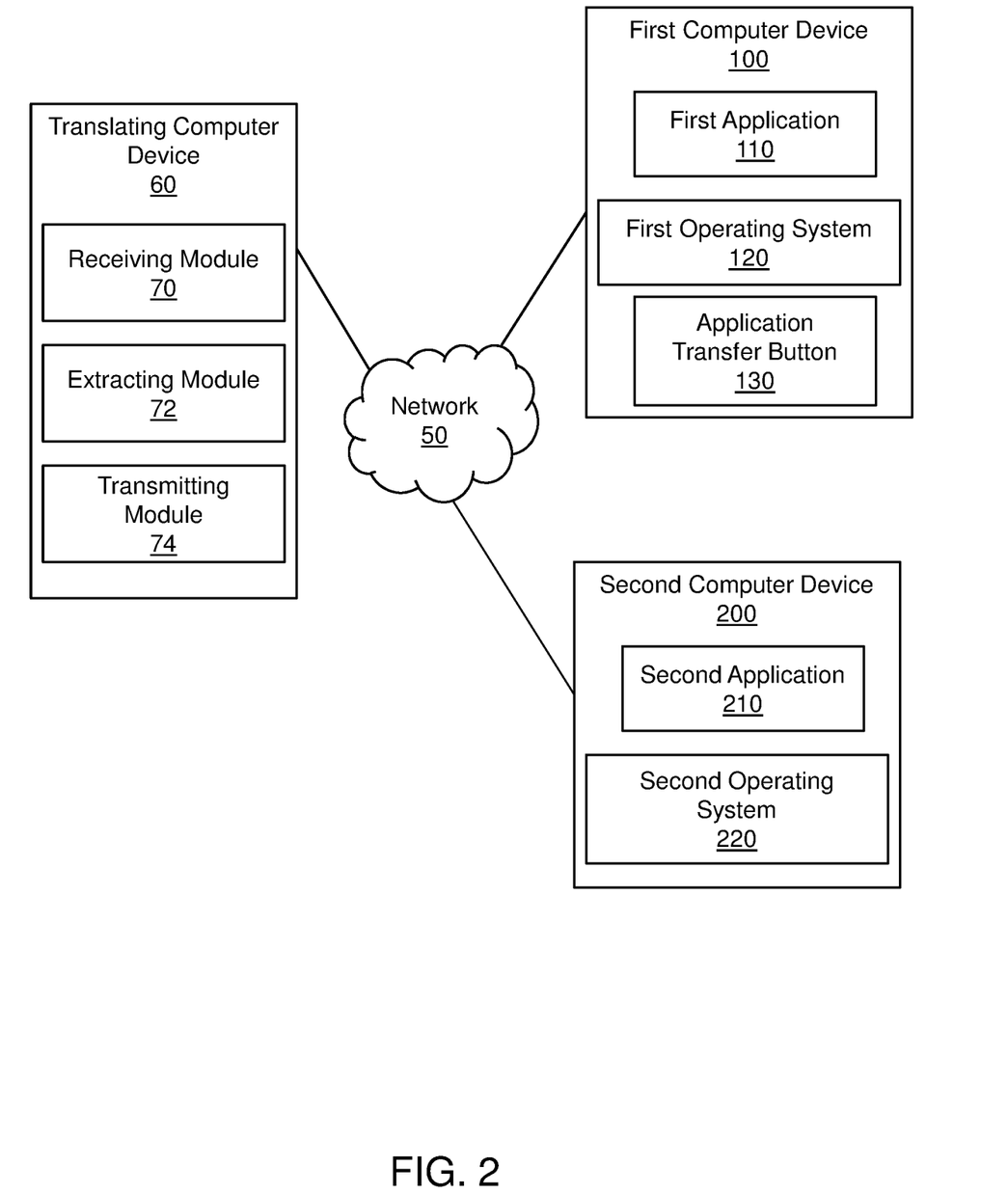
FIG. 2 shows an exemplary environment in accordance with aspects of the invention.

FIG. 2 shows an exemplary environment in accordance with aspects of the invention. In aspects, the present invention extracts working session data about a first application from a first computer device running on a first OS and computer architecture, converts the working session data of the first application into a format compatible with a second application running on a second OS and computer architecture, transmits the working session data to a second computer device, and opens the second application on the second computer device which may be automatically populated with the converted working session data. In aspects, the first OS and computer architecture may be non-identical to the second OS and computer architecture. In embodiments, the present invention may extract working session data, convert the working session data, and transmit the working session data between non-identical applications within the same computing architecture.

In aspects, the extraction of working session data, conversion of the working session data, and transmission of the working session data between non-identical applications encapsulates or containerizes the information and the fields of the working session data for the second computer device. Additionally, the present invention may provide the headers and metadata for the second application on the second computer device according to the type and category of the application and not based on file type. For example, the present invention may analyze the headers and metadata of the working session data on the first application and map the headers and metadata of the working session data to the second application in a format operable on the OS of the second computer device.

With continued reference to FIG. 2, the exemplary environment includes a translating computer device 60 which may comprise a computer system 12 of FIG. 1, and may be connected to a network 50 (e.g., via the network adapter 20 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

The translating computer device 60 may comprise a plurality of modules configured to perform one or more functions described herein. In aspects, the translating computer device 60 may include additional or fewer modules than those shown in FIG. 2. In aspects, separate components may be integrated into a single computing component or module. Additionally, or alternatively, a single module may be implemented as multiple computing components or modules (e.g., program modules 42 of FIG. 1).

As described herein, the translating computer device 60 includes a receiving module 70, an extracting module 72, and a transmitting module 74. Each module in the translating computer device 60 may be implemented as multiple computing components or modules (e.g., program modules 42 of FIG. 1). In embodiments, the translating computer device 60 is configured for communication via the network 50 with a first computer device 100 and a second computer device 200. The first computer device 100 and the second computer device 200 may be, for example, personal digital assistants (PDA), cellular telephones, desktop computers, laptop computers, tablet computers, and/or computer systems that may communicate over the network 50.

In aspects, the first computer device 100 may include a first application 110 stored on a hard drive (e.g., storage system 34 of FIG. 1), the first application running on a first operating system 120 (e.g., desktop-based OS, mobile OS, etc.). The first application 110 may be a word processing application, a spreadsheet application, an email application, a computer-aided design application, or any other suitable application stored on the first computer device 100.

In aspects, the first computer device 100 may also include an application transfer button 130 which may be selected by a user to begin the operations of the translating computer device 60. The application transfer button 130 may be a virtual button on the display or interface of the first computer device 100 which may be used to initiate a process to transfer the context (e.g., data within a single application or multiple applications) to a different computer device running on a different computing architecture or between the same computing architecture with non-identical applications.

In aspects, the second computer device 200 may include a second application 210 stored on a hard drive (e.g., storage system 34 of FIG. 1), the second application running on a second operating system 220 (e.g., desktop-based OS, mobile OS, etc.). The second application 210 may be a word processing application, a spreadsheet application, an email application, a computer-aided design application, or any other suitable application stored on the second computer device 200.

Still referring to FIG. 2, the receiving module 70 is configured to receive an indication from a user, operating a working session on the first computer device 100, that the user would like to continue the working session on the second computer device 200. In aspects, in response to the user selecting the application transfer button 130, the receiving module 70 receives an indication from the first computer device 100 to transfer data from the first application 110 to the second application 210.

Based on receiving the indication to transfer data from the first application 110 to the second application 210, the extracting module 72 extracts data from the first application 110 on the first computer device 100. In aspects, the extraction of the data may be done in the background and out of view of the user.

For example, the extracting module 72 may extract email data (e.g., text from the subject line, text of the email, etc.) from the email application on the desktop computer after opening the email application on the desktop computer. The extracting module 72 may also determine the information for use in the headers and metadata of the email application of the first computer device 100 and transmit the information to the email application of the second computer device 200.

As described herein, the information for the header may include information such as the destination for the data. For example, the information for the header may include information that the destination of the data of the email application of the first computer device 100 may be to the email application of the second computer device 200.

The information for the metadata may include pieces of information of each field of the application. For example, the information for the metadata may include information regarding the "to" field of an email for the email application of the first computer device 100, which will later be transmitted to the email application of the second computer device 200.

In aspects, the extracting module 72 converts the data from the first application 110 into a format useable by the second application 210. For example, the extracting module 72 converts the email data from the email application of the first computer device 100 into a format useable by the email application of the second computer device 200.

In embodiments, the converting comprises mapping the data from the first application 110 to the fields of the second application 210. The fields may include, for example, the appropriate header and metadata of the first application and the second application.

In aspects, the extracting module 72 stores data structures that define mappings between fields of respective applications. For example, a first data structure may define a mapping of fields of spreadsheet A running on the first operating system 120 to corresponding fields of spreadsheet B running on the second operating system 220. In another example, a second data structure may define the mapping of fields of the spreadsheet to corresponding fields of a word processing application. In yet another example, a third data structure may define the mapping of fields of a presentation application to corresponding fields of word processing application. In still another example, a fourth data structure may define the mapping of fields of a work-based calendaring application to corresponding fields of email application. The present invention is not limited to the examples described herein, and may include other examples of accessing data structures that define mappings between fields of different applications.

By way of example, the extracting module 72 maps the converted data for the "to" field of an email for the email application of the first computer device 100 to the appropriate "send to" field of an email for the email application of the second computer device 200. By way of another example, the header field of a presentation application of the first computer device 100 may by mapped to the header field of the word processing application of the second computer device 200.

In aspects, the extracting module 72 may map the data according to type of application (e.g., identical types of applications). For example, the extracting module 72 may map the data between two different spreadsheet applications, two different word processing applications, two different email applications, two different web applications, etc.

In other aspects, the extracting module 72 may map the data between multiple types of application (e.g., non-identical types of applications), provided the extracting module 72 extracted sufficient mapping data for two different applications. For example, the extracting module 72 may map the data between a spreadsheet application and a word processing application, an email application and a word processing application, a spreadsheet application and a web application, etc.

Based on mapping the data, the transmitting module 74 transmits the data to the second computer device 200. For example, the transmitting module 74 transmits the email data, which has been converted to a format operable by the second application 210, to the second computer device 200. In aspects, based on extracting the data, the transmitting module 74 transmits an open command which tasks the second computer device 200 with opening the second application 210 with the converted data from the first application 110. For example, the transmitting module 74 transmits an open command (e.g., an email open command) to the second computer device 200 that opens the email application running on the second computer device 200 with the converted data from the email application running on the first computer device 100.

In optional aspects, based on mapping the data, the transmitting module 74 determines whether the data of the first application 110 has been saved or auto-saved prior to transmitting the data. In embodiments, if the data of the first application 110 has been saved, the transmitting module 74 determines the email Universal Note Identification or other unique identification of the first application 110 which includes the saved data of the first application 110.

Based on determining the data has been saved, the transmitting module 74 closes or minimizes the application window of the first application 110 and transmits a signal to the first operating system 120 of the first computer device 100 that the transmitting module 74 is ready to transmit the saved data of the first application 110. The transmitted signal may include, but is not limited to, a synchronization command and the email Universal Note Identification in addition to the saved data. In aspects, the application window of the first application 110 may be opened or maximized for further editing, which when further edited will update the email Universal Note Identification or other unique identification of the first application 110.

In response to determining the data has been saved, the transmitting module 74 may transmit additional information on the signal to the second computer device 200. For example, the signal may include updates of the data of the first application 110 and an application programming interface (API) call to the second computer device 200 to open the second application 210 with the email Universal Note Identification or other unique identification of the first application 110 which includes the saved data of the first application 110. In this manner, the present invention allows a user to transfer the recently updated saved data to the second application 210 from the first application 110 without having to determine whether the signal comprises the recently updated data.

Based on determining the data in the application has not been saved (e.g., non-saved or a non-save of the data), the transmitting module 74 copies the data content of first application 110. Based on copying the data and determining the data has not been saved, the transmitting module 74 closes the first application 110 without saving and may transmit a signal directly to the second computer device 200. For example, the signal may include the copied data and a request to create a new document for the second application 210 with the copied data of the first application 110.

Additionally, the transmitting module 74 may inform the user of completion of the transfer of the data of the first application 110 on the first computer device 100 to the second application 210 on the second computer device 200. For example, the transmitting module 74 may inform the user of the completion of the transfer of email data from the first computer device 100 to the email application on the second computer device 200.

Figure 3:
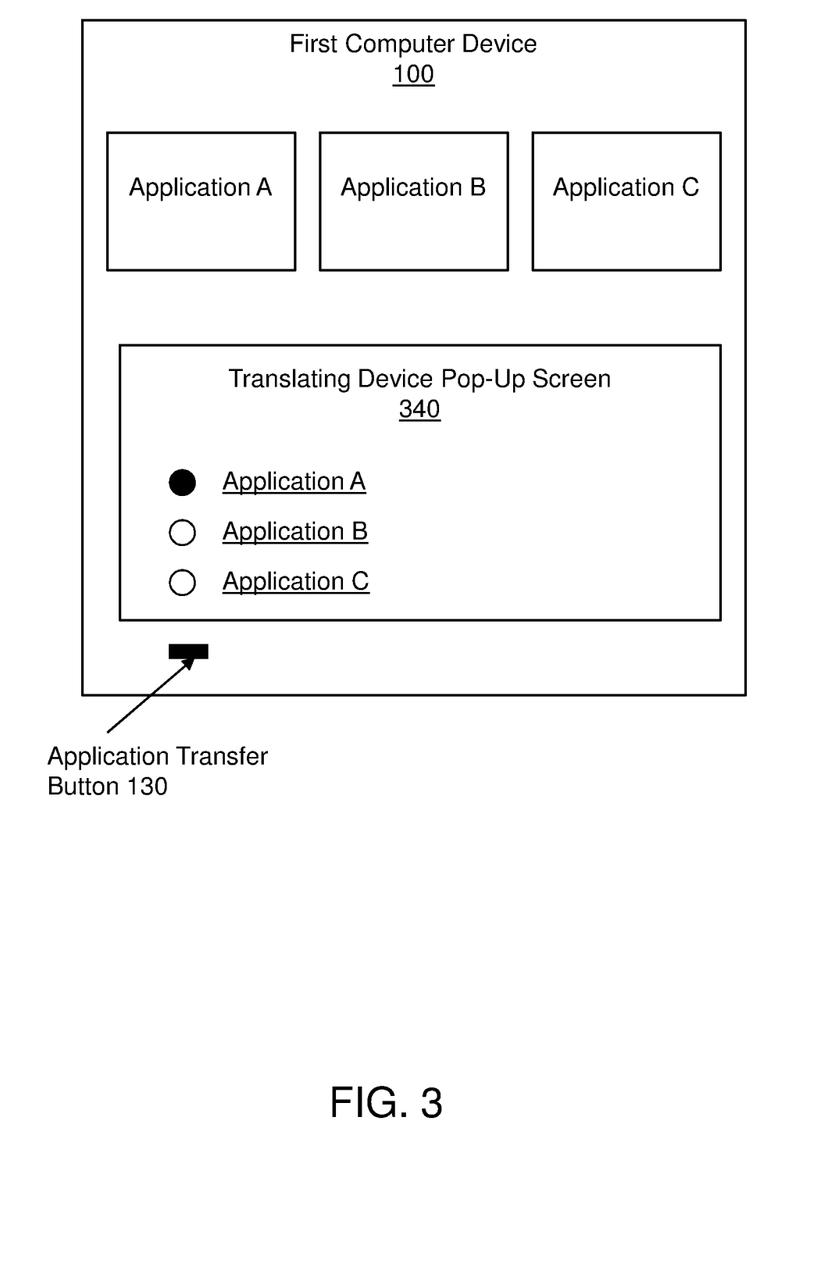
FIG. 3 shows another exemplary environment in accordance with aspects of the invention.

FIG. 3 shows another exemplary environment in accordance with aspects of the invention. In implementations, the first computer device 100 may include multiple applications, such as Application A, Application B, and Application C. As described herein, Application A, Application B, Application C may be, but are not limited to a word processing application, a spreadsheet application, application email, or any other suitable application stored on the first computer device 100.

In embodiments, the first computer device 100 may display the application transfer button 130 which, when selected by a user of the first computer device 100, initializes a translating device pop-up screen 340. The translating device pop-up screen 340 allows a user to select the application or multiple applications, where the data from the application or applications may be received by the receiving module 70 of the translating computer device 60 and transmitted to the second computer device 200. In aspects, upon selection of the application transfer button 130, the first computer device 100 may transmit data from the selected applications in the translating device pop-up screen 340 to the receiving module 70 of the translating computer device 60 and transmitted to the second computer device 200.

In other embodiments, the translating device pop-up screen 340 may also include applications related to the working session of the user that are not currently active but related to the work of the working session of the user. For example, during a working session, a user may utilize a corporate email application. Upon selection of the application transfer button 130, the translating device pop-up screen 340 may include the email of the client, the virtual private network of the corporation, a web page to the corporate directory, and the corporation's homepage (e.g., the context or data within the email application and other corporate applications). In another example, during a working session in which the user works on a personal email application about a particular corporation, the translating device pop-up screen 340 may include the email client, two of the ten open web pages related to the particular corporation, and a portable document format (PDF) document that lists requirements of the particular corporation. The present invention is not limited to the examples described herein, and may include other examples of the context or the data of applications related to the working session of the user.

In aspects, the present invention automatically populates the translating device pop-up screen 340 without having the user login to each application. For example, upon selection of the application transfer button 130, the translating device pop-up screen 340 is populated with user selectable application options related to the work of the working session of the user.

By way of an example, during a working session when a user works on a laptop with multiple monitors, multiple applications, and multiple open windows, the user receives an email on the user's mobile phone. The user begins at reading the email using the mobile phone email application running on a mobile phone OS of the mobile phone. While reading the email, the user discovers that the email is from the user's general manager requesting immediate information on a client's request for a proposal. The user clicks the reply button and begins drafting an email in response to the request from the manager. Midway through typing the email, the user decides that email could be made better by using the user's laptop. The user selects the application transfer button 130 to transfer the email from the mobile phone to a laptop email application on the user's laptop, which has better functionality (e.g., ability for multiple monitors, multiple applications, and multiple open windows, etc.) and runs on a laptop OS.

In aspects, the user may designate the data transfer from multiple applications (e.g., Application A, Application B, Application C) on the first computer device 100 to multiple applications on the second computer device 200 via the translating device pop-up screen 340. In other aspects, the user may designate the data transfer to devices other than the second computer device 200.

Based on transmitting the data to the second computer device 200, the translating computer device 60 converts the draft email that was in progress in the mobile phone email application running on the mobile phone OS to a format operable for the laptop email application running on the laptop OS. Thereafter, the translating computer device 60 launches the draft email on the laptop email application and moves the focus of the working session to the laptop email application of the laptop to complete the draft email in response to the general manager request.

Figure 4:
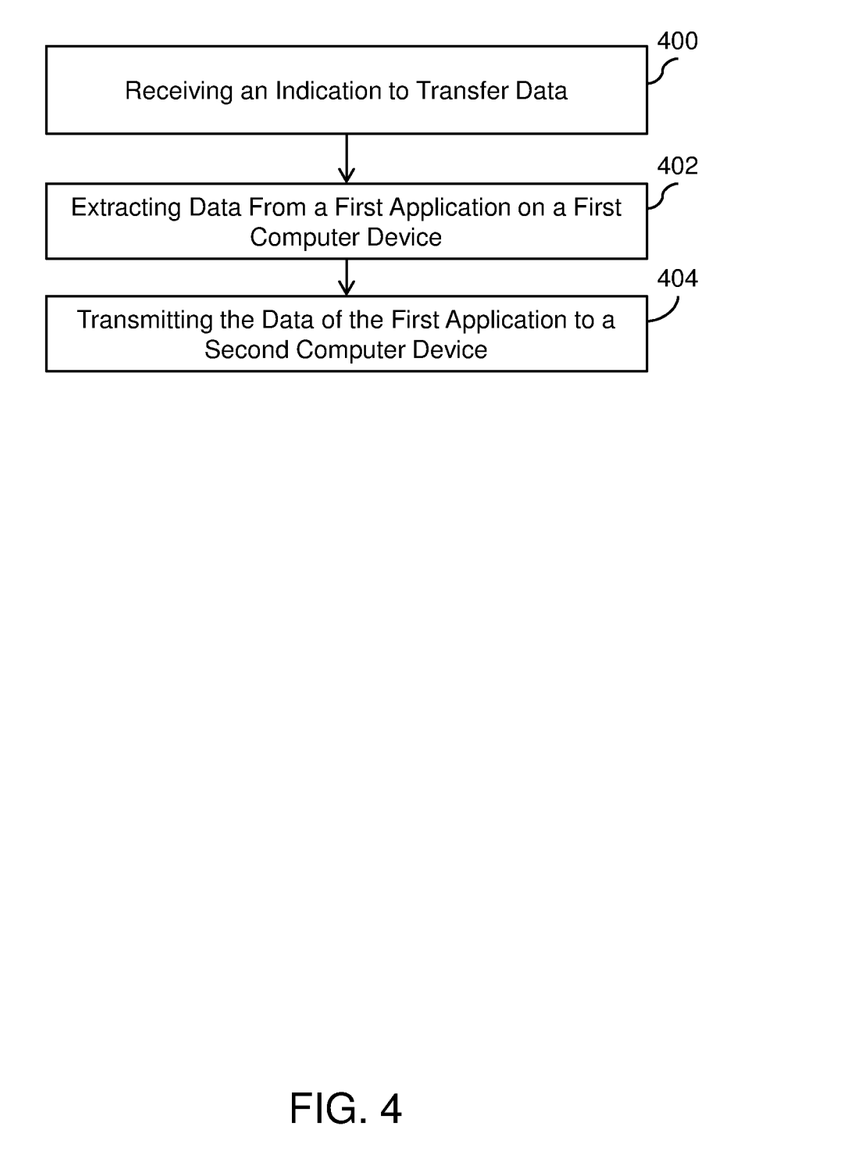
FIG. 4 shows a flowchart of steps of a method in accordance with aspects of the invention.

FIG. 4 shows a flowchart of a method in accordance with aspects of the invention. Steps of the method of FIG. 4 may be performed in the environment illustrated in FIG. 2, and are described with reference to elements shown in FIG. 2.

At step 400, the translating computer device 60 receives an indication to transfer data from a first application 110 on a first computer device 100 running on a first operating system 120 to a second application 210 on a second computer device 200 running on a second operating system 220. In aspects, the receiving module 70 receives an indication to transfer data from the first application 110 on the first computer device 100 to the second application 210 on the second computer device 200.

For example, as described with respect to FIG. 2, the receiving module 70 may receive an indication to transfer data from a spreadsheet application on a desktop running a desktop-based OS. The indication may be from a user or other suitable operator (e.g., a request from another application stored on the first computer device 100) of the first computer device 100.

At step 402, the translating computer device 60 extracts data from the first application 110 on the first computer device 100. In aspects, based on receiving the indication to transfer data from the first application 110 to the second application 210 at step 400, the extracting module 72 extracts data from the first application 110 on the first computer device 100.

For example, as described with respect to FIG. 2, the extracting module 72 extracts data from the spreadsheet application on the desktop computer. The extracted data may include data in the cells of the spreadsheet and data in other areas of the spreadsheet. In aspects, the extracting module 72 may analyze, convert, and map the data into a format (e.g., mobile OS system) operable on the second computer device 200 (e.g., a laptop).

At step 404, the translating computer device 60 transmits the data of the first application 110 to the second computer device 200. In aspects, based on extracting data from the first application 110 on the first computer device 100 at step 402, the transmitting module 74 transmits the data of the first application 110 to the second computer device 200 based on the extracting.

For example, as described with respect to FIG. 2, the transmitting module 74 transmits the data extracted from the spreadsheet application on the desktop computer to a laptop computer. As described herein, according to converting and mapping the data of the spreadsheet into a format usable on the laptop, the transmitting module 74 transmits the data to the laptop running on the mobile OS system.

As described herein, step 404 may comprise the transmitting module 74 transmitting an open command to the second computer device 200 which tasks the second computer device 200 with opening the second application 210 with the converted data from the first application 110. For example, the transmitting module 74 transmits an open command to the second computer device 200 and the second computer device 200 opens a non-identical spreadsheet application on the laptop and populates the non-identical spreadsheet application with the data transmitted from the desktop computer.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for automated device setting customization based on real-time user characteristic data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computer device, such as computer system 12 (as shown in FIG. 1), from a computer-readable medium; (2) adding one or more computer devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by a translating computer device, an indication to transfer data from a first application on a first computer device running on a first operating system to a second application on a second computer device running on a second operating system that is different than the first operating system;
extracting, by the translating computer device, the data from the first application on the first computer device based on the receiving, the extracting comprising converting the data from the first application into a format useable by the second application; and
transmitting, by the translating computer device, the converted data to the second computer device based on the extracting,
wherein the data extracted from the first application is a partially completed working session,
the converted data transmitted to the second computer device is useable by the second application to complete the partially completed working session,
the first application is a calendar application,
the second application is an email application, and
the converted data is email data after the conversion.

2. The computer-implemented method of claim 1, further comprising receiving the indication to transfer the data based on a selection of an application transfer button on a translating device pop-up screen.

3. The computer-implemented method of claim 2, wherein the translating device pop-up screen allows for selection of multiple applications on the first computer device.

4. The computer-implemented method of claim 2, wherein the selection of the application transfer button initiates a process to transfer a context from the first computer device to the second computer device.

5. The computer-implemented method of claim 1, wherein the converting comprises mapping the data from the first application to fields of the second application.

6. The computer-implemented method of claim 5, wherein the mapping comprises accessing data structures that define mapping between fields of the first application to the fields of the second application.

7. The computer-implemented method of claim 1, wherein the transmitting comprises transmitting an open command to the second computer device.

8. The computer-implemented method of claim 7, wherein the open command tasks the second computer device with opening the second application with the data from the first application.

9. The computer-implemented method of claim 1, wherein the extracting data from the first application comprises extracting data from a mobile phone, and
the extracting comprises converting the data from the first application into a format useable by a laptop computer.

10. A computer program product comprising a computer readable storage medium having program instructions embodied therewith, the program instructions executable by a computing device to cause the computing device to:
receive an indication to transfer data from a first application on a first computer device running on a first operating system to a second application on a second computer device running on a second operating system that is different than the first operating system;
in response to the receiving, extract data from the first application by converting the data from the first application into a format useable by the second application by mapping the data from fields of the first application to fields of the second application; and
transmit the converted data to the second computer device based on the converting,
wherein the data extracted from the first application is a partially completed working session,
the converted data transmitted to the second computer device is useable by the second application to complete the partially completed working session,
the first application is a calendar application,
the second application is an email application, and
the converted data is email data after the conversion.

11. The computer program product of claim 10, further comprising determining a save of the data of the first application.

12. The computer program product of claim 10, further comprising determining a non-save of the data of the first application.

13. The computer program product of claim 12, further comprising copying the data of the first application based on the non-save of the data.

14. The computer program product of claim 10, wherein a selection of an application transfer button initiates a process to transfer a context from the first computer device to the second computer device.

15. The computer program product of claim 10, wherein the extracting data from the first application comprises extracting data from a mobile phone, and
the extracting comprises converting the data from the first application into a format useable by a laptop computer.

16. A system for transferring data among devices, comprising:
a central processing unit (CPU), a computer readable memory and a computer readable storage medium associated with a computing device;
program instructions to receive an indication to transfer data from a first application on a first computer device running on a first operating system to a second application on a second computer device running on a second operating system that is different than the first operating system;
program instructions to extract data from the first application on the first computer device based on the receiving, the extracting comprising converting the data from the first application into a format useable by the second application; and
program instructions to transmit the converted data to the second computer device based on the converting,
wherein the data extracted from the first application is a partially completed working session,
the converted data transmitted to the second computer device is useable by the second application to complete the partially completed working session,
the first application is a calendar application,
the second application is an email application,
the converted data is email data after the conversion, and
the program instructions are stored on the computer readable storage medium for execution by the CPU via the computer readable memory.

17. The system of claim 16, wherein extracting the data comprises mapping the data from fields of the first application to fields of the second application.

18. The system of claim 16, wherein a selection of an application transfer button initiates a process to transfer a context from the first computer device to the second computer device.

19. The system of claim 16, wherein the program instructions to extract data from the first application are program instructions to extract data from a mobile phone, and
    the extracting comprises converting the data from the first application into a format useable by a laptop computer.

20. The system of claim 16, wherein the extracting data from the first application comprises extracting data from a mobile phone, and
    the extracting comprises converting the data from the first application into a format useable by a laptop computer.

\* \* \* \* \*